(No Model.)
L. P. POMEROY.
TRUCK FOR SUPPORTING VEHICLES.
No. 590,743. Patented Sept. 28, 1897.
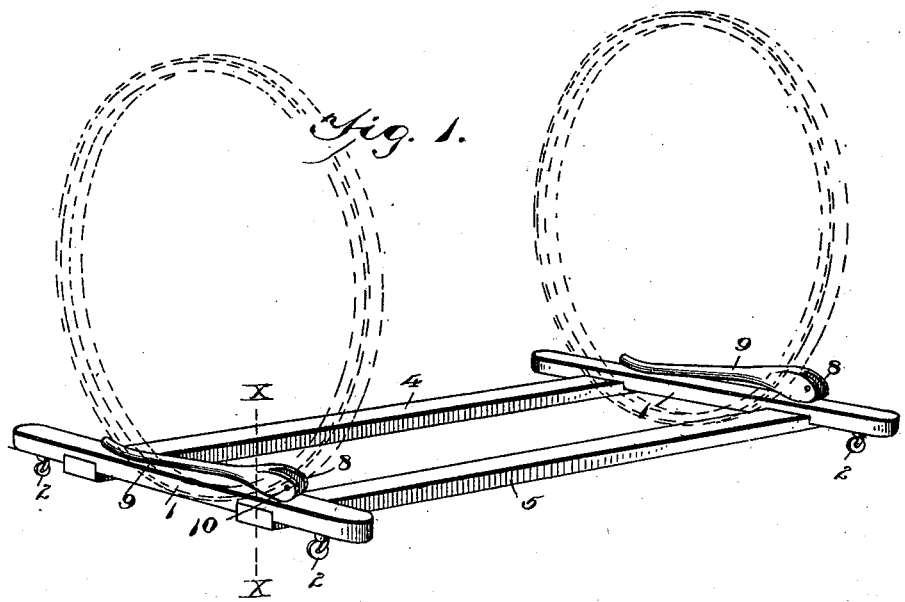
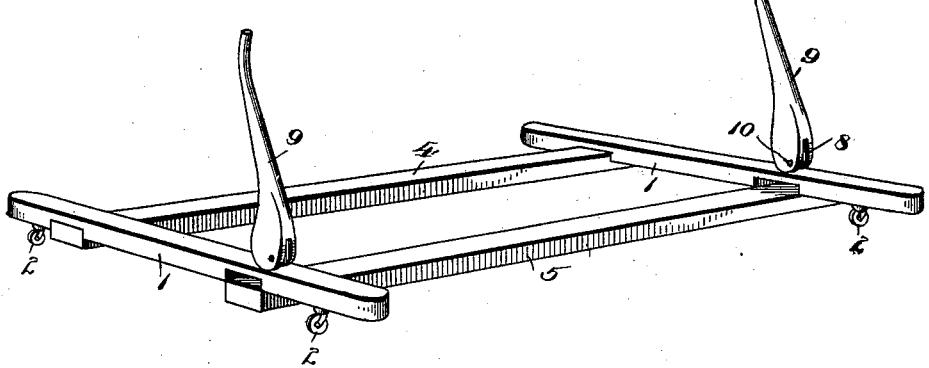
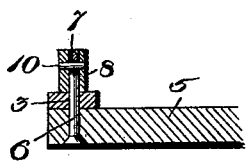
Witnesses:
Inventor
Louis P. Pomeroy
By John Wedderburn.
Attorney

UNITED STATES PATENT OFFICE.

LOUIS P. POMEROY, OF YARMOUTHVILLE, MAINE.

TRUCK FOR SUPPORTING VEHICLES.

SPECIFICATION forming part of Letters Patent No. 590,743, dated September 28, 1897.

Application filed April 21, 1897. Serial No. 633,200. (No model.)

*To all whom it may concern:*

Be it known that I, LOUIS P. POMEROY, a citizen of the United States, residing at Yarmouthville, in the county of Cumberland and State of Maine, have invented certain new and useful Improvements in Supports for Turning Carriages and Vehicles; and I do hereby declare the following to be a full, clear, and exact description of the invention, such as will enable others skilled in the art to which it appertains to make and use the same.

This invention relates to devices for turning carriages and vehicles within a small space in a stable or other place; and it consists, essentially, of an adjustable frame mounted on suitable rollers and adapted to support the back wheels of the vehicle.

The invention further consists of the details of construction and arrangement of the several parts, which will be more fully hereinafter described and claimed.

The object of the present invention is to provide means for wheeling or turning a vehicle within a small space, either in a stable or elsewhere, the parts being simple and effective in operation, strong and durable, and comparatively inexpensive in the cost of manufacture.

In the accompanying drawings, Figure 1 is a perspective view of the improved device, showing the wheels of a vehicle in dotted lines thereon in operative position. Fig. 2 is a similar view of the device, showing a part thereof adjusted to receive the wheels of a vehicle. Fig. 3 is a section on the line $x\,x$, Fig. 1.

Referring to the drawings, wherein similar numerals of reference are employed to indicate corresponding parts in the several views, the numeral 1 designates opposite end bars, having depending from the under sides thereof and adjacent to the outer ends casters 2 of any preferred form of construction. Near one end of each of the said end bars 1 is an aperture 3, and running from one end bar to the other are side bars 4 and 5. The side bar 4 is stationary, and the side bar 5 has posts 6 extending upwardly therefrom, with upper apertured ends or heads 7, which are engaged by the enlarged cam ends 8 of clamping-levers 9, the latter having pins 10 extending through the apertures in the heads of the posts.

In applying the device in operative position the levers 9 are elevated, as shown in Fig. 2, and through the cam-heads 8 thereof the posts 6 are moved downwardly through the apertures 3, thereby lowering the said bar 5, so that the wheels of the vehicle may be readily raised thereover and be located between the two bars 4 and 5. After the wheels are so positioned the levers 9 are depressed, as shown by Fig. 1, thereby raising the bar 5 and sustaining it in an elevated position in a plane parallel with the bar 4. When the wheels are so positioned on the side bars, they are held against movement by reason of the fact that said side bars are spaced apart, and the rear portion of the wagon may be swung or turned in any direction on the casters 2. This forms a convenient means of adjusting or shifting the vehicle within a small space or of transporting small vehicles from one point to another, such as sleighs and the like.

The material of which the parts of the device are constructed may be varied to suit the application and to insure strength and durability, and it is obviously apparent that many minor changes in the details of construction might be made and substituted for those shown and described without in the least departing from the nature and spirit of the invention.

Having thus described the invention, what is claimed as new is—

1. In a device of the character set forth, the combination of a pair of end bars mounted on casters, and side bars connecting the same, one of the latter being adjustable, substantially as and for the purposes specified.

2. In a device of the character set forth, the combination of a pair of end bars mounted on casters and having openings therein near one end, a stationary side bar and a movable side bar having posts extending upwardly through said openings with apertured heads, and clamping-levers engaging the apertured heads of said posts, substantially as and for the purposes specified.

In testimony whereof I have signed this specification in the presence of two subscribing witnesses.

LOUIS P. POMEROY.

Witnesses:
L. R. COOK,
LYMAN P. COOK.